United States Patent [19]
Albrecht

[11] Patent Number: 5,848,508
[45] Date of Patent: Dec. 15, 1998

[54] CORE FOR A PATIO ENCLOSURE WALL AND METHOD OF FORMING THEREOF

[76] Inventor: Ronald Albrecht, 10186 Overhill Dr., Santa Ana, Calif. 92705

[21] Appl. No.: 721,357

[22] Filed: Sep. 26, 1996

[51] Int. Cl.$^6$ .............................. E04C 2/296; E04B 2/02
[52] U.S. Cl. ..................... 52/309.9; 52/309.14; 52/780; 52/781; 52/794.1; 52/796.1; 52/800.12
[58] Field of Search ............................. 52/309.8, 309.9, 52/309.14, 783.1, 794.1, 796.1, 800.1–800.12, 780, 781, 775, 762

[56] References Cited

U.S. PATENT DOCUMENTS

| | | | |
|---|---|---|---|
| 3,538,668 | 11/1970 | Anderson . | |
| 4,071,993 | 2/1978 | Stewart et al. | 52/309.5 |
| 4,628,650 | 12/1986 | Parker | 52/309.9 X |
| 5,136,822 | 8/1992 | Blum . | |
| 5,220,760 | 6/1993 | Dimakis | 52/309.9 |
| 5,280,689 | 1/1994 | Mill | 52/309.9 |
| 5,349,796 | 9/1994 | Meyerson | 52/309.9 X |
| 5,373,674 | 12/1994 | Winter | 52/309.9 |

*Primary Examiner*—Robert Canfield

[57] ABSTRACT

A core for a patio enclosure wall includes a first layer formed of polyisocyanurate material and a second layer formed of plasterboard bonded to the first layer. The core may be sandwiched between a weather resistant exterior panel and an interior surface to form a panel/core assembly for a patio enclosure wall. The core of the present invention provides fine thermal insulation. The plasterboard components serve to prevent the spread of flames. Furthermore, the core serves as an efficient sound barrier.

9 Claims, 1 Drawing Sheet

CORE FOR A PATIO ENCLOSURE WALL AND METHOD OF FORMING THEREOF

BACKGROUND OF THE INVENTION

1. Field of the Invention

The present invention relates to patio enclosures and more particularly to wall structures for such patio enclosures.

2. Description of the Related Art

Patio enclosures typically referred to as "non-inhabitable structures," in the past have had walls often formed with honeycombed cores between a weather resistant exterior panel and an interior surface. The interior surface might comprise a panel of spackle and paint. The honeycombed cores have been typically formed using a cardboard material. However, this has had the disadvantage of deteriorating when exposed to moisture and offering no sound barrier, vapor barrier or insulation value. Furthermore, this material is unable to hold wall fasteners, and has insufficient weight to provide stability in wind conditions.

In an advance of the technology related to the patio enclosure industry, walls having insulative cores of polyisocyanurate have been utilized between the exterior wall panel and the interior wall surface. This core material is typically sold under the trademarks Thermax™ or Celotex™. However, this core material has had the disadvantages of serving as a minimal sound barrier and minimal vapor barrier. Furthermore, it has only a limited ability to hold fasteners. Additionally, it is lightweight therefore contributing little to structure in wind conditions.

In a further advance of this technology extruded polystyrene has been utilized as the core material. However, this material suffers from the main disadvantages noted above with respect to polyisocyanurate.

OBJECTS AND SUMMARY OF THE INVENTION

In view of the foregoing, it is a principal object of the present invention to provide a core material for a patio enclosure wall which has good thermal insulation properties and is an effective sound and vapor barrier.

It is another object to provide a patio enclosure wall which is of sufficient weight for providing stability during windy conditions.

It is another object to provide a patio enclosure wall in which fasteners supporting substantial objects can be installed.

It is still another object to provide a patio enclosure wall which is low cost.

These and other objects are achieved by the present invention which in its broadest aspects is a core for a patio enclosure wall which comprises a first layer formed of polyisocyanurate material and a second layer formed of plasterboard bonded to the first layer.

The core may be sandwiched between a weather resistant exterior panel and an interior surface to form a panel/core assembly for a patio enclosure wall.

The core of the present invention provides fine thermal insulation. The plasterboard components serve to prevent the spread of flames. Furthermore, the core serves as an efficient sound barrier. It's relatively heavy weight assists in eliminating room "shake" during high winds or when the doors are closed. The plasterboard provides a suitable nail or fastener surface for bearing weight from attached objects. The polyisocyanurate first layer may include a foil surface which provides a vapor barrier preventing moisture entry.

The invention meets the criterion of 'low cost' essential to providing "inexpensive" square footage to existing dwellings in a modular system that can be manufactured and installed with minimal "on-site" labor expenses. Further installation of walls using the invention requires little field training for installation personnel to become fully proficient.

Other objects, advantages, and novel features will become apparent from the following detailed description of the invention when considered in conjunction with the accompanying drawings.

BRIEF DESCRIPTION OF THE DRAWINGS

The same parts or elements throughout the drawings are designated by the same reference characters.

DETAILED DESCRIPTION OF THE PREFERRED EMBODIMENTS

Figure 1:
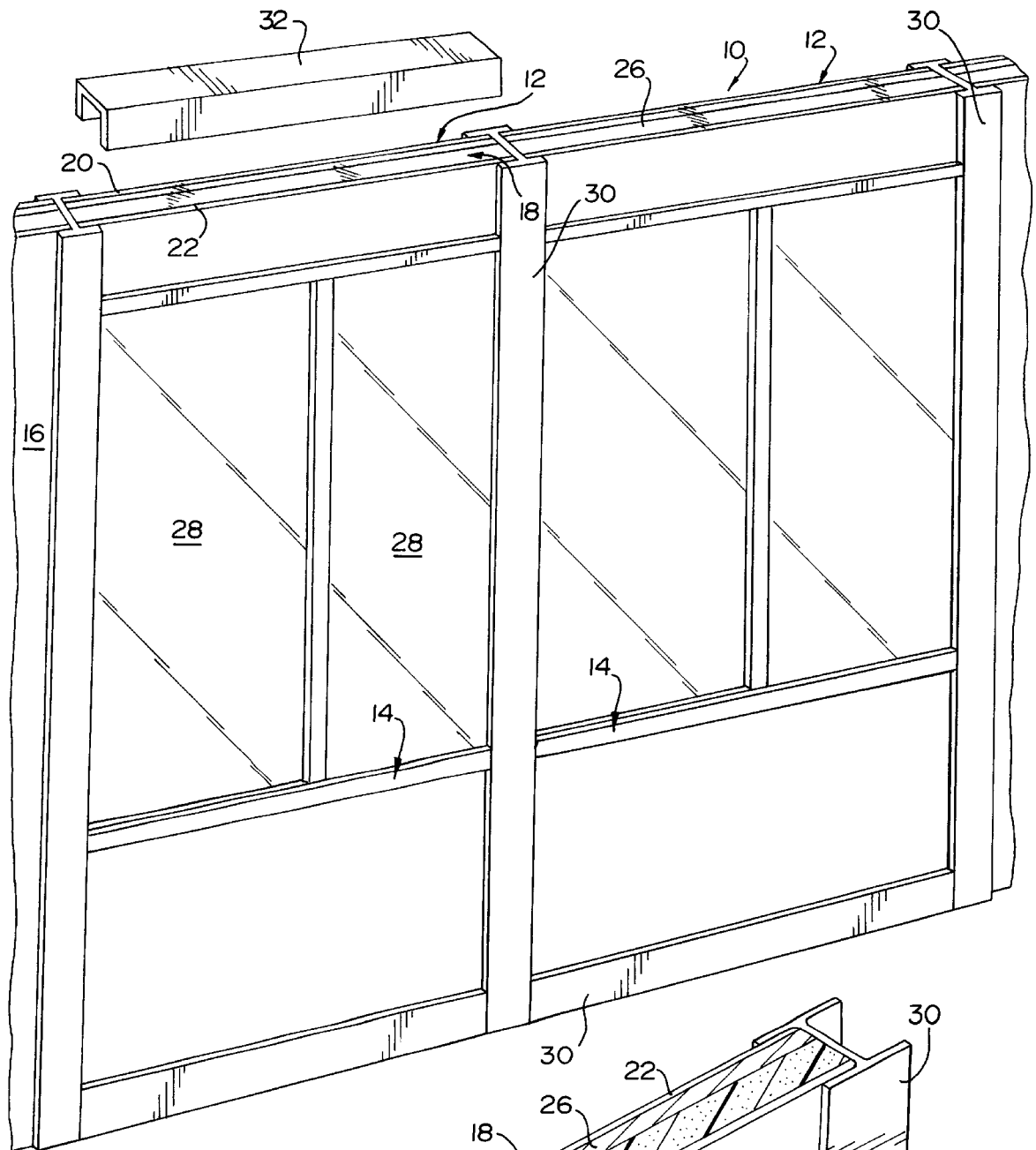
FIG. 1 is a perspective view of a portion of a patio enclosure wall constructed in accordance with the principles of the present invention.
Figure 2:
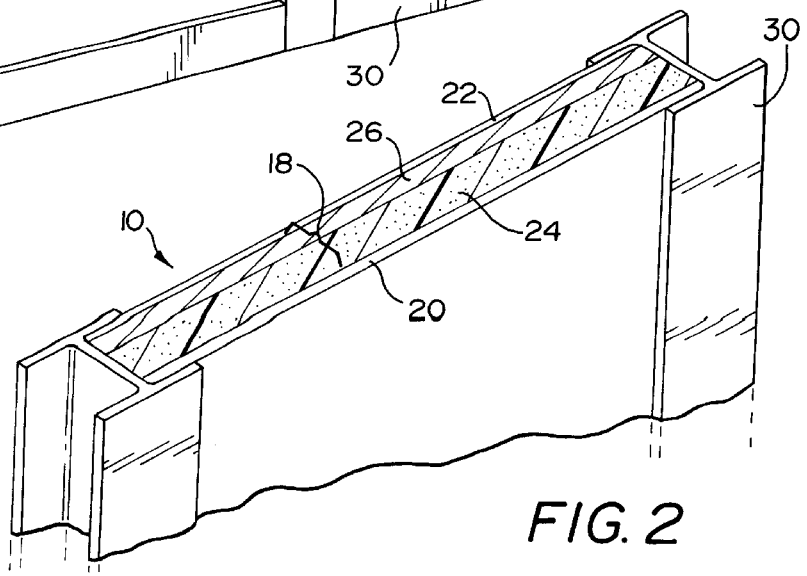
FIG. 2 a top perspective view of a portion of the patio enclosure wall of FIG. 1.

Referring now to the drawings and the characters of reference marked thereon, FIGS. 1 and 2 illustrate a portion of a patio enclosure wall constructed in accordance with the principles of the present invention, designated generally as 10. The wall 10 includes panel/core assemblies 12, 14, 16 which may be of varying sizes and shapes. Each panel/core assembly includes a core 18 sandwiched between a weather resistent exterior panel 20 and an interior surface 22.

The core 18 includes a first layer 24 of polyisocyanurate material bonded to a second layer 26 formed of plasterboard. Layers 24 and 26 are preferably bonded by an adhesive substance such as a water-based glue. The polyisocyanurate layer 24 has a thickness in a range of about 0.75 inches to 4 inches, typically about 1.25 inches to 3.25 inches. The plasterboard layer 26 has a thickness in a range of about 0.25 inches to about 1 inch, typically about 0.5 inches. The plasterboard is of the conventional type which utilizes gypsum.

The exterior panel 20 is typically formed of exterior grade hardboard paneling. The interior surface 22 may comprise a coating, for example, spackle and paint. Alternately, it may comprise an interior panel such as interior grade paneling. (For certain applications, exterior grade hardboard paneling may be used.)

Panel/core assemblies constructed as such can be made in various desired shapes and sized for use in desired portions of the patio enclosure wall. For example, as shown in FIG. 1, assemblies 12 and 14 are shown to accommodate side sliding window inserts 28. Or, solid sections may be utilized, as illustrated by assembly 16. Panel/core assemblies may be joined by use of conventional extruded aluminum frames 30 which may be shaped as an I-Beam. The frames 30 provide structural support. Conventional aluminum frame top caps 32 may be used.

Cores 18 may be formed by applying a desired layer of adhesive material to either a first layer of polyisocyanurate material or a second layer of plasterboard. The first layer is positioned against the second layer so that the layer of adhesive material is sandwiched therebetween. A compressive force is applied on the sandwiched layers in a range of between 300 to 1000 $lb/in^2$ for a period of 3 to 12 hours. Preferably, the compressive force is applied at about 600 $lb/in^2$.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A patio enclosure wall, comprising:

a panel/core assembly, comprising:

a weather resistant exterior panel;

an interior surface; and a flat core sandwiched between said exterior panel and said interior surface, said core comprising:

a) a first layer formed of polyisocyanurate material, said first layer having a thickness in a range of about 1.25" to about 3.25", said first layer having two opposed sides which are flat; and b) a flat second layer formed of plasterboard bonded to a flat side of said first layer, said second layer having a thickness in a range of about 0.25" to about 1"; and a structural support member for providing structural support of the patio enclosure wall, said structural support member securely positioning said panel/core assembly, said structural support member comprising an I-beam which receives an edge of said panel/core assembly.

2. The patio enclosure wall of claim 1, wherein said structural support member is formed of metal.

3. The patio enclosure wall of claim 2, wherein said metal is aluminum.

4. The patio enclosure wall of claim 1, wherein said first layer and second layer are bonded by an adhesive substance.

5. The patio enclosure wall of claim 4, wherein said adhesive substance comprises:

a water-based glue.

6. The patio enclosure wall of claim 1, wherein said interior surface comprises an interior panel.

7. The patio enclosure wall of claim 1, wherein said interior surface comprises spackle and paint.

8. The patio enclosure wall of claim 1 further comprising:

an extruded metal support structure encapsulating at least one edge of said panel/core assembly.

9. The patio enclosure wall of claim 8, wherein said metal support structure is formed of aluminum.

\* \* \* \* \*